M. ENGSTROM.
TRAP.
APPLICATION FILED JUNE 26, 1908.

904,608.

Patented Nov. 24, 1908.

Witnesses

Inventor
Mauritz Engstrom.
By C. A. Snow & Co.
Attorneys

UNITED STATES PATENT OFFICE.

MAURITZ ENGSTROM, OF SIREN, WISCONSIN.

TRAP.

No. 904,608.

Specification of Letters Patent.

Patented Nov. 24, 1908.

Application filed June 26, 1908. Serial No. 440,603.

*To all whom it may concern:*

Be it known that I, MAURITZ ENGSTROM, a citizen of the United States, residing at Siren, in the county of Burnett and State of Wisconsin, have invented a new and useful Trap, of which the following is a specification.

This invention relates to that class of animal traps having spring actuated jaws which are released and snapped to closed position by the weight of an animal stepping on a small platform and releasing a trigger.

The object of the invention is to provide an improved trap of this kind which will operate effectively and readily catch an animal.

The invention consists of an improved animal trap constructed and arranged as hereinafter set forth and claimed.

Figure 1:
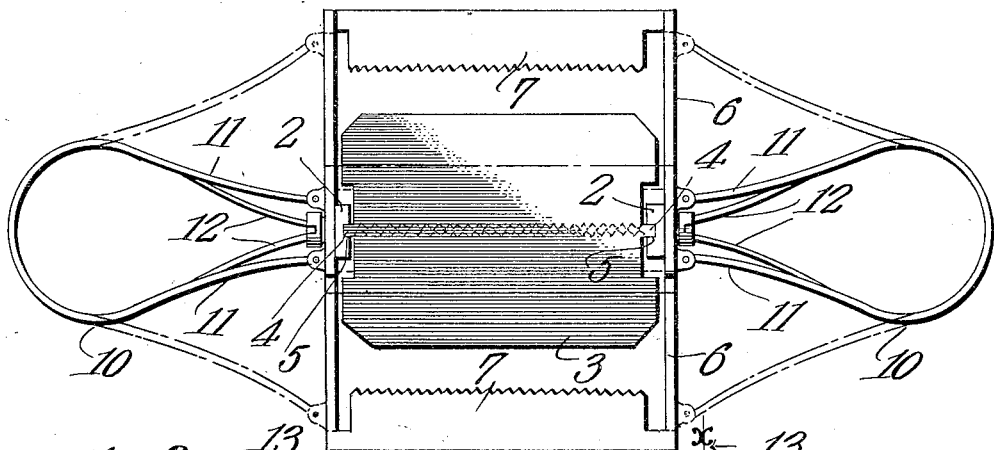
Figure 2:
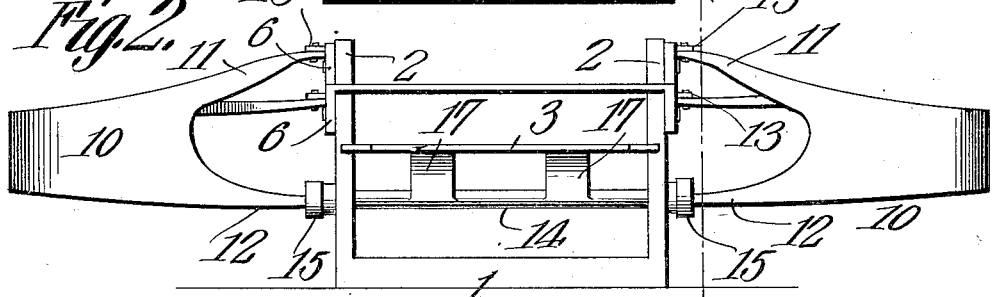
Figures 3, 4, 5:
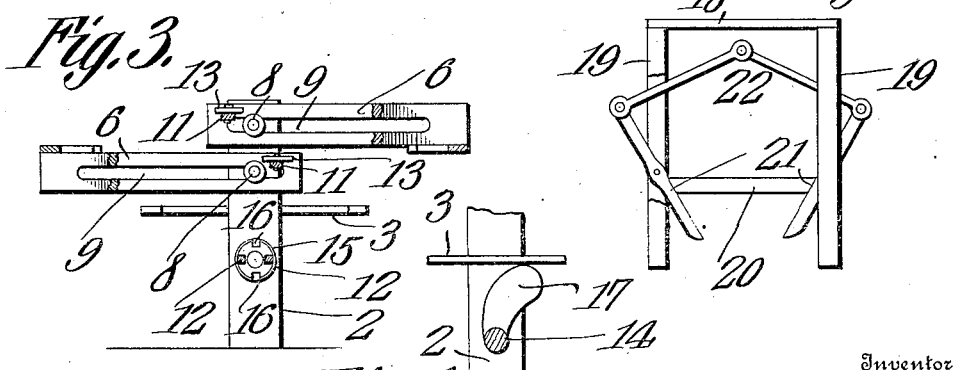

Referring to the accompanying drawing:— Figure 1 is a plan view of the invention showing the trap set. Fig. 2 is an end view thereof. Fig. 3 is a side view partly broken away and in vertical section on the line x—x Fig. 2. Fig. 4 is a detail view of a portion of the device for springing the trap. Fig. 5 shows a device for setting the trap.

The trap is constructed with a frame consisting of a cross bar 1, and uprights 2. A small platform 3 is mounted in the uprights 2, and is vertically movable thereon by means of a projection 4 on each side engaging a vertical groove 5 in the inner face of each upright 2. Located on opposite sides of and above the platform 3 are frames 6, each having at its outer end a toothed jaw 7, the said frames 6 being slidably mounted one above the other on the upper end of the uprights 2 by means of pins 8 on said uprights engaging longitudinal slots 9 in the frame 6. To snap the jaws 7 to closed position suitable springs are provided, and as here shown, preferably the U-shaped springs 10, extending laterally from the sides of the trap, and having upper and lower pairs of arms 11, and 12, the upper arms 11 being pivotally connected to lugs 13 on the frames 6 at their inner end, and the lower arms 12 being adapted to engage a device for releasing the springs and jaws. The releasing or tripping device consists of a rotary shaft 14 mounted in the uprights 2 adjacent to their lower end, and projecting through the same. Upon each projecting end of the shaft 14 is a cylindrical socket 15 having slots 16 in its rim opposite to each other. The shaft 14 is provided between the uprights 2 with cam shaped projections 17, so positioned with reference to the platform 3, which rests thereon, that the weight of an animal stepping thereon will cause the platform 3 to act as a trigger on the cam projections 17 to turn the shaft 14.

When the trap is unset the springs 11, and jaws 7 will be in the position shown in dotted lines in Fig. 1 of drawing and the cylindrical sockets 15 will be in a position which places the slots 16 in a horizontal line transverse to the uprights 2. To set the trap the springs 10 are compressed to the position shown in Fig. 1, which draws the frames out to the extended position shown in Fig. 1, with the jaws 7 set in open position.

The ends of the lower pairs of arms 12 are moved through the slots 16 into the cylindrical sockets 15, and the shaft 14 is turned to bring the slots 16 to the position shown in Fig. 3 thereby retaining the ends of arms 12 in the sockets 15. In this position the cam projections 17 project against the platform 3 so as to be operated by a weight brought to bear upon the platform and the trap is set. To compress and hold the springs 10 while setting the trap a suitable key or setting device may be employed, and as here shown consisting of a U-shaped frame 18 with slotted uprights 19 connected at a little distance from their ends by a cross bar 20, and having pivoted in the uprights lever arms 21 adapted to fold into the uprights 19.

The upper ends of the lever arms 21 are connected together by a toggle lever 22 by means of which they may be moved into closed position in the uprights 19, or have their lower ends moved inwards and towards each other. To use the device the lever arms 21 being folded into the uprights 20, the latter are set over, and outside of the arms 12. Then by pressing down on the toggle lever 22 the lower ends of the lever arms 21 are pressed inwards and move the arms 11, and 12 of the springs 10 together, thereby enabling the ends of arms 12 to be inserted in sockets 15, and held together till the shaft 14 is turned to lock the ends of arms 12 in the sockets 15.

The trap in use is secured in place in any well known manner, and being set will be instantly sprung by the weight of an animal stepping on the platform, the latter acting on the cam projections 17, which causes the shaft 14 to rotate a quarter of a turn thereby bringing the slots 16 to a horizontal position upon which the ends of arms 12 fly out of sockets 15. The springs 10 being thereby released will expand and draw the frames 6 inwards thereby causing the jaws 7 to snap together.

Having described the invention, I claim:—

1. An animal trap having slidable jaws movable towards each other; springs connected with said jaws to close them; a tripping device adapted to be detachably connected with said springs; and a trigger platform adapted to operate said tripping device.

2. An animal trap provided with slidable frames with jaws movable towards each other; springs connected with said frames to operate the same, a tripping device adapted to be detachably connected with said springs; and a trigger platform movable against, and adapted to operate said tripping device.

3. An animal trap having slidable jaws movable towards each other; springs connected with said jaws to close the same; a tripping device adapted to be detachably connected with said springs, and hold them under tension, and a vertically movable trigger platform adapted to operate said tripping device.

4. An animal trap provided with slidable jaws movable towards each other; springs connected with said jaws to close the same; a rotary cam operated tripping device adapted to be detachably connected with said springs and hold them under tension; and a movable trigger platform connected with and adapted to act on said tripping device.

5. An animal trap provided with slidable frames having jaws; springs having pairs of arms, one pair being connected with said frames, and the other being free, a tripping device adapted to be detachably connected with the free arms of said springs; and a trigger platform movable against said tripping device to actuate the same.

6. An animal trap consisting of a frame with uprights; a pair of frames with jaws slidable on the uprights to close the jaws; springs having pairs of arms, one pair connected with the slidable frames, and the other pair free; a rotary shaft in said frame with cam projections and means at its ends for holding the free arms of the springs under tension, and releasing the same; and a trigger platform slidably mounted in said frame, and resting on the cam projections.

7. An animal trap consisting of a frame with uprights; horizontal frames with jaws slidable past each other on said uprights; springs having pairs of arms, one pair connected with said frames to operate the same, and the other pair being free; a rotary shaft having cams, and cylindrical slotted sockets adapted to hold the free arms of the springs under tension, and release the same; and a platform vertically movable in said uprights, and resting on said cams of the rotary shaft.

In testimony that I claim the foregoing as my own, I have hereto affixed my signature in the presence of two witnesses.

MAURITZ ENGSTROM.

Witnesses:
  N. C. FOLGER,
  EMMA SLOAN.